United States Patent [19]

Richard et al.

[11] 4,426,047
[45] Jan. 17, 1984

[54] SINGLE REEL TAPE CARTRIDGE

[75] Inventors: Maurice E. Richard; Daniel J. Winarski, both of Tucson, Ariz.

[73] Assignee: International Business Machines Corp., Armonk, N.Y.

[21] Appl. No.: 362,440

[22] Filed: Mar. 26, 1982

[51] Int. Cl.³ .................. G11B 23/04; G11B 15/32; G03B 1/56

[52] U.S. Cl. .................. 242/197; 242/195; 226/92

[58] Field of Search .......... 242/195, 197, 198, 199, 242/200, 74; 226/91, 92; 360/95, 131, 134

[56] References Cited

U.S. PATENT DOCUMENTS

| | | | |
|---|---|---|---|
| 3,025,011 | 3/1962 | Camras | 242/195 |
| 3,214,108 | 10/1965 | Louzil | 242/195 X |
| 3,424,393 | 1/1969 | Goodell et al. | 242/55.13 |
| 3,664,607 | 5/1972 | Trefzger et al. | 242/195 |
| 4,290,562 | 9/1981 | Sasaki et al. | 242/74 |
| 4,355,858 | 6/1982 | Cranna | 242/195 |

Primary Examiner—Stuart S. Levy
Assistant Examiner—Lloyd D. Doigan
Attorney, Agent, or Firm—J. A. Pershon; H. F. Somermeyer

[57] ABSTRACT

A single reel tape cartridge is disclosed for an automatic threading tape drive. The reel includes layers of magnetic tape with a leader block attached to the free end of the tape. The leader block is held in a receiving well in one corner of the cartridge when the cartridge is out of a tape drive. The leader block interconnects with a threading pin in the drive for threading the tape through the drive to a take-up reel hub. The leader block includes conforming sections that fit the leader block into a U-shaped channel in the hub to provide a smooth hub periphery for the layers of tape.

20 Claims, 12 Drawing Figures

SINGLE REEL TAPE CARTRIDGE

CROSS REFERENCE TO RELATED APPLICATIONS

This application is copending with patent applications Ser. No. 164,732, now U.S. Pat. No. 4,335,858, and Ser. No. 164,733, now U.S. Pat. No. 4,334,656, filed June 30, 1980; Ser. No. 249,266 filed Mar. 30, 1981; Ser. No. 315,112 and Ser. No. 315,120 filed Oct. 26, 1981; and Ser. No. 161,808 filed June 23, 1980, all assigned to the assignee of the present invention.

These copending applications disclose different automatic apparatus for threading the tape over a complex tape path as well as the action of the leader block as a door seal and the interaction of the leader block with the take-up reel. The claims of these copending applications are directed to the inventions as produced by applicants of these inventions.

FIELD OF THE INVENTION

This invention relates in general to single reel cartridges for magnetic tape and, in particular, to a cartridge configuration in which a leader block attached to the free end of the web material provides a compliant configuration for matching with a take-up reel to prevent creases in the tape.

BACKGROUND OF THE INVENTION

It is desirous in a single reel tape cartridge to provide a means for interconnecting the tape web into the tape driving system in a manner such that the leader block interacts with the take-up reel in order that the tape sees a smooth surface for storage on the take-up reel. An automatic threading apparatus generally includes a coupling device and a mechanism for moving the coupling device over a predetermined non-linear path extending from the supply reel within the cartridge to a take-up reel in the tape transport device. The function of the coupling device is to selectively engage the leader block, which is firmly attached to the end of the tape wound on the supply reel, in the generally rectangular tape cartridge.

The coupling device is generally designed so as to remain coupled to the leader block during the winding and unwinding operation and also to remain attached to the mechanism that has transported the leader block and the coupling device from the position adjacent to the cartridge to the position associated with the take-up reel.

As described in the copending applications, the coupling device includes a pin disposed with its axis parallel to the axis of rotation of the supply and take-up reels. The leader block must interact with the coupling device in a manner which permits the coupling device to be disposed coaxially with the axis of the take-up reel and in a manner such that the leader block is free to rotate about the pin during the winding and unwinding process. Further, the leader block must be compliant to form with the take-up reel to provide a smooth surface for the tape.

DESCRIPTION OF THE PRIOR ART

The prior art is exemplified by the leader block and cartridge design shown in U.S. Pat. Nos. 3,107,835; 3,424,393; 3,025,011; 3,214,108; and 3,664,607. The leader block of the U.S. Pat. No. 3,107,835 includes spring fingers which are formed to grasp a pull member to pull the tape from the cartridge. The pull member and the leader block are stored within a take-up reel. No provisions are shown for covering the leader block storage area.

It is, therefore, an object of the present invention to provide a tape cartridge havig a coupling member that positively attaches to a pulling member with the coupling member shaped to form a part of the hub of the take-up reel.

In the U.S. Pat. No. 3,424,393, the leader block or latching member includes a bifurcated configuration that matches with a pull member because of the press-fit arrangement between the couplers. The coupled members fit into a recess in the take-up reel. No provisions are made to form the coupled members or the recess to provide a smooth hub surface for subsequent layers of tape.

In the U.S. Pat. No. 3,025,011, two hooks engage to thread the tape through the drive. The take-up reel has a slot in its hub for accommodating the engaged hooks such that they do not provide a protuberance which might interfere with the subsequent layers of tape. The contour of the slot and the shape of the hook assembly are said to be such as to provide a smooth bump-free base for subsequent windings. There is no showing of a cartridge wherein the attachment mechanism for threading the tape forms a part of the hub of the take-up reel.

Another object of the present invention is to provide a single reel cartridge that includes a leader block formed to fill a slot in the take-up reel and to be compliant to accommodate the first layer of tape when wound on the take-up reel hub.

In the U.S. Pat. No. 3,214,108, a leader block or tag is attached to the free end of a tape from a cartridge. The tag fits into an indentation in the hub of a take-up reel. Neither the indentation nor the tag is shaped to provide a smooth hub surface for subsequent layers of tape.

In the U.S. Pat. No. 3,664,607, the requirements are recognized for providing a smooth hub for a take-up reel. The cartridge includes a loop of tape at the free end for mating with a leader hook attached to a leader tape. The take-up reel includes a grooved inner hub to accommodate the hook and an outer hub to wind the tape. The grooved inner hub accommodates the hook but there is no shaping of either the hook or the tape end to provide a smooth outer surface for the subsequent layers of tape.

Yet another object of the present invention is to provide a tape system for a cartridge tape that positively interfaces an automatic threading device with a leader block attached to the end of the tape from the reel in the cartridge and that keeps the threading device attached to the leader block while the leader block form fits with a take-up reel to provide a smooth hub for subsequent layers of tape.

SUMMARY OF THE INVENTION

In accordance with the present invention, a magnetic tape cartridge includes an approximately square box having two elongated side pieces, elongated leading edge and rear edge pieces, all interconnecting nearly flat top and bottom sections, with a tape access opening to the interior of the cartridge at one corner of the leading edge and one side piece and a drive means opening in the bottom section of the box. The tape access opening includes a leader block receiving well. The cartridge includes a reel supporting a web of magnetic tape with the free end of the magnetic tape connected to a leader block positiond for containment in the leader block receiving well. The leader block has a cutout section for attaching the free end of the tape to the leader block. The leader block also includes a cavity formed parallel to the cutout section adjacent to the rear surface and the side surface of the leader block. The leader block is shaped for attachment to an automatic threading system and is of a size to fit into a cutout in the take-up reel in a tape drive such that the rounded rear surface of the leader block is of the same radius as the hub of the leader block with the cavity and the cutout section in the leader block complying the leader block shape to the cutout in the hub of the take-up reel under the tension of the layers of tape.

For the preferred embodiment, a magnetic tape cartridge includes an approximately square box having a web of magnetic tape while on a reel positioned within the box and a leader block attached to the end of the tape. The leader block includes a slot for attachment to an automatic threading device and a cutout section in one side approximate to its rear surface for attaching the free end of the tape to the leader block. The leader block further includes at least one cavity formed parallel to the cutout section and adjacent to its rear surface and the side surface which contains the cutout section. The leader block is of a rectangular box shape with a rounded rear surface. The leader block is of a size to fit into a cutout in a take-up reel of a tape drive with the rounded rear surface approximating the radial surface of the hub of the take-up reel with the cavity and the cutout section in the leader block being compliant to accommodate a first wrap of tape across the rounded rear surface of the leader block.

It is, therefore, an object of the present invention to provide an improved single reel tape cartridge.

Another object of the present invention is to provide a tape cartridge that includes a leader block having a positive action coupling means for attachment to an automatic threading system wherein the leader block is shaped to conform with a hub and compliant to accommodate a tape thickness when under compression.

A further object of the present invention is to provide a magnetic tape cartridge having a leader block connected to the free end of the tape media in which the leader block is adapted for interconnection to a tape threading system in a tape drive for placement into a take-up reel to form part of the hub.

These and other objects of the present invention will become apparent to those skilld in the art as the description proceeds.

BRIEF DESCRIPTION OF THE DRAWINGS

The various novel features of this invention, along with the foregoing and other objects, as well as the invention itself, both as to its organization and method of operation, may be fully understood from the following description of illustrated embodiments when read in conjunction with the accompanying drawing, wherein.

DESCRIPTION OF THE PREFERRED EMBODIMENTS

Figure 1:
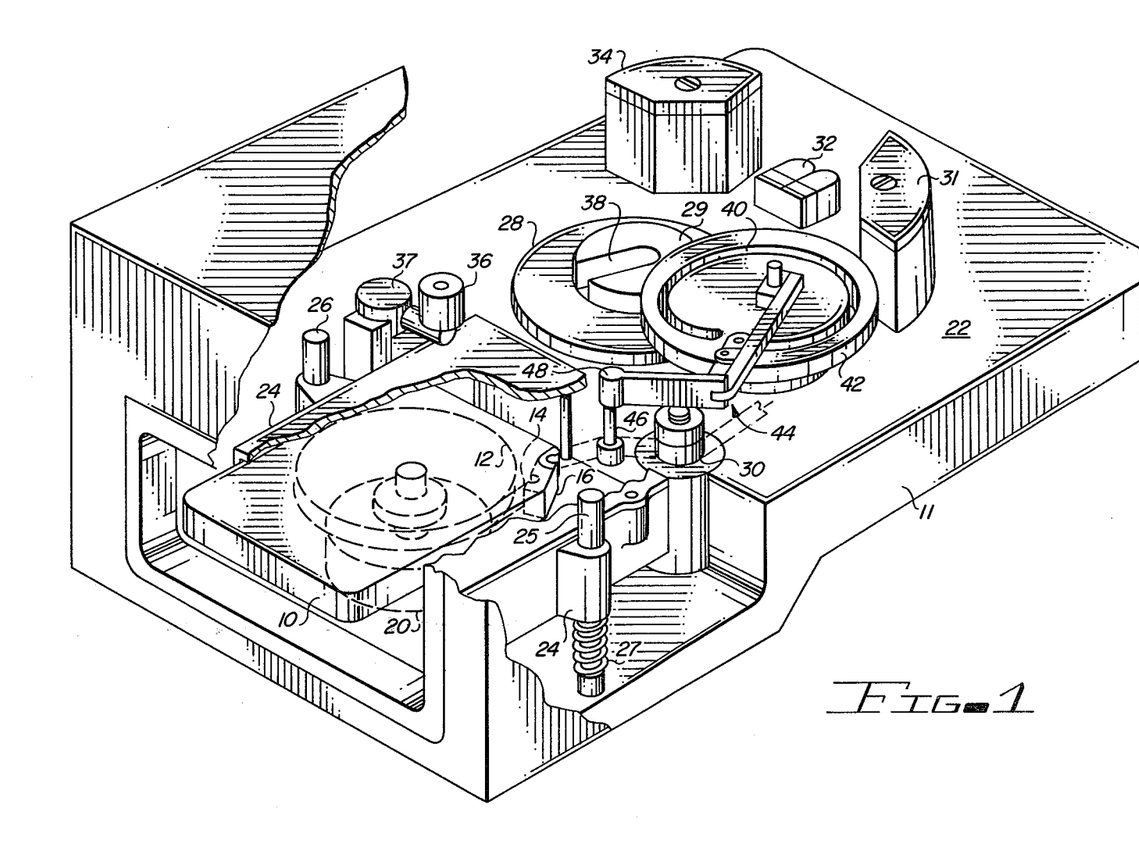
FIG. 1 is a perspective view of a reel-to-reel magnetic tape drive embodying a cartridge according to the present invention.

Referring to FIG. 1, a reel-to-reel magnetic tape drive apparatus is shown including a threading apparatus for connection to a single reel tape cartridge 10 according to the present invention. The tape transport apparatus includes a base plate 11 on which various standard components of a magnetic tape transport are mounted. The tape cartridge 10 is replaceable and includes a reel 12 of magnetic tape 14. A leader block 16 is disposed in the cartridge and is accessible externally. The leading edge of the tape 14 is attached to the side of the leader block 16. A drive motor 20 for the supply reel 12 is mounted beneath the base plate 11 so that its shaft extends normal to the surface and slightly above a surface 22 of the base plate 11. The motor shaft is provided with a suitable clutching arrangement which permits the motor to be coupled to the hub of the supply reel 12 by movement of the cartridge 10 in a direction normal to the surface 22. As shown, this vertical movement is achieved by the cartridge loading mechanism, a portion of which is designated by reference character 24, along shafts 25 and 26 against springs mounted on the shafts, one shown at reference numeral 27.

A take-up reel 28 is permanently attached to a motor (not shown) which is mounted to the base plate 11 in a suitable fashion. The cartridge reel 12, when coupled to its motor 20, lies in substantially the same plane as a hub 29 of the take-up reel 28 so that a point on the tape 14 moves in a plane normal to both motor shafts when being transported. After the threading of the tape 14, transfer of the tape between the supply reel 12 and the take-up reel 28 is achieved by control of the respective driving motors for the reels as is well known in the art for reel-to-reel tape drives. The tape 14 passes a roller guide 30, an air bearing guide 31, a magnetic transducer head 32, a second air bearing guide 34, and a roller 36 of a tension transducer 37. The guide bearings 31 and 34 are positioned in the tape path so that the magnetic pigment side of the magnetic tape 14 slides over their air bearing surfaces with the magnetic tape 14 coacting with the magnetic head 32 to read and write magnetic transitions to and from the magnetic tape 14.

Figure 2:
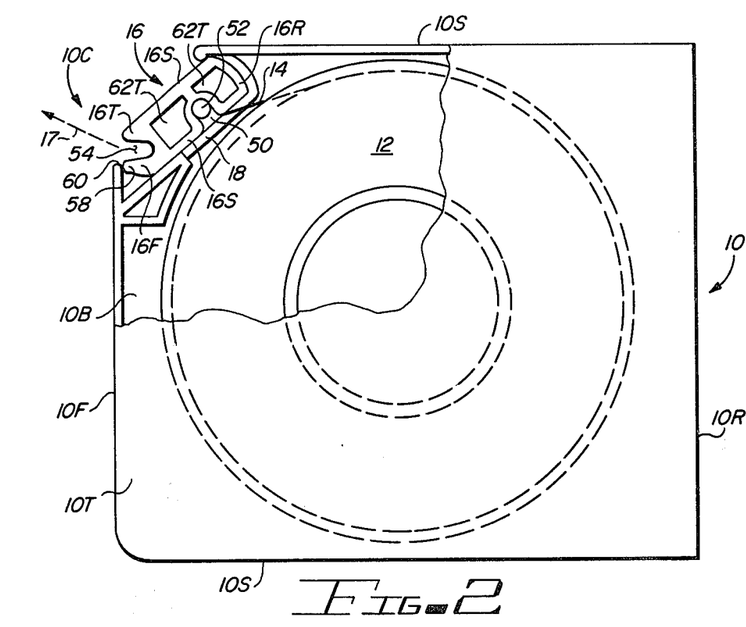
FIG. 2 is a plan view of a single reel magnetic tape cartridge as shown in FIG. 1 embodying the leader block of the present invention.

The automatic threading apparatus provides two functional aspects. The first involves moving and guiding a coupling device from the supply reel to the take-up reel, and the second involves selectively coupling the leader block at the supply reel in a manner to permit the leader block to be rotated with the take-up reel without being uncoupled from the threading apparatus. The moving and guiding function is implemented, as shown in FIG. 1, by a cam groove 40 formed in a cam substrate 42. A pantoarm mechanism 44 follows the cam groove 40 to define the path that the leader block 16 and the tape 14 will follow. A threading pin 46 couples to the leader block 16 with the pin 46 traveling through the tape path to the take-up reel 28. For a more complete description of the function of each of the components described above reference is made to the aforementioned patent application, Ser. No. 315,112. Since the specific details of these components do not form a part of the present invention except for the cartridge 10 and the take-up reel 28, they have not been illustrated or described in detail. The details of the cartridge 10 according to the preferred embodiment is shown in FIG. 2. FIG. 2 shows the preferred embodiment for the cartridge box 10 which includes the reel hub 12 containing a plurality of layers of the magnetic tape 14 with the leader block 16 attached to the free end of the tape 14 as it extends from the reel hub 12. The cartridge box, cartridge 10, is generally rectangular in shape except for one corner 10C which holds the leader block 16. The cartridge 10 is basically a box-like structure including elongated pieces: a frontal or leading edge piece 10F, a rear edge piece 10R, two side pieces 10S, an essentially flat bottom section 10B, and an essentially flat top section 10T. The corner 10C is angled at approximately 45° relative to one adjacent side 10S and the leading edge 10F to provide a shorter fifth side in which a leader block window 18 is included. This leader block window 18 permits the exiting of the tape 14 from the cartridge 10 when the leader block 16 is removed from the corner 10C for threading through a tape drive when the leader block 16 is moved in the direction of the arrow 17. The opening 18 is covered by the leader block 16 when the leader block is snapped into the well formed at the corner 10C of the cartridge 10.

The leader block 16 can be viewed generally as a rectangular block having a leading or frontal surface 16F, a rear surface 16R, side surfaces 16S, a top surface 16T, and a bottom surface 16B opposie the top surface 16T. A cutout 50 extends normal to the top and bottom surfaces of the leader block 16 and the cartridge 10. The cutout 50 together with a pin 52 form a fastening means for holding the tape 14 to the leader block 16. The tape 14 is attached to the leader block 16 such that the side surfaces 16S of the leader block are generally parallel to the plane of the tape surface and the axis of the tape reel 12. The front surface 16F of the leader block 16 includes the engaging means for engaging an automatic threading apparatus. The engaging means include a slot 54 offset from the front surface 16F of the leader block 16 and generally extending from the top surface 16T to the bottom surface 16B of the leader block. The front surface 16F of the leader block is generally cylindrical and is provided with a rounded boss 58 which engages with an inclined surface 60 of the corner 10C of the cartridge 10. Cavities 62T are formed in the top 16T of the leader block 16 adjacent to the cutout 50 and closer to one side 16S and the rear 16R of the leader block 16. A bottom and side view of the leader block 16 is shown in FIGS. 3A and 3B, respectively.

Figure 3A:
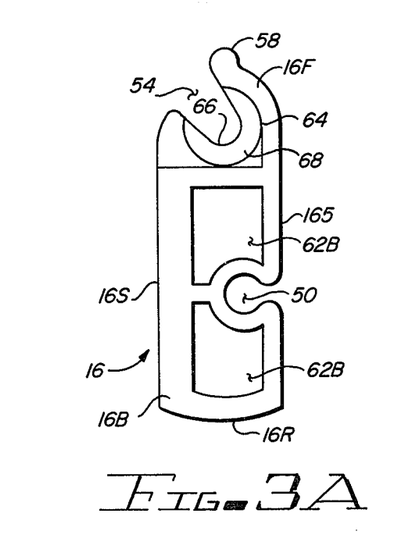
FIGS. 3A and 3B are bottom and side plan views, respectively, of the leader block shown in FIGS. 1 and 2.
Figure 3B:
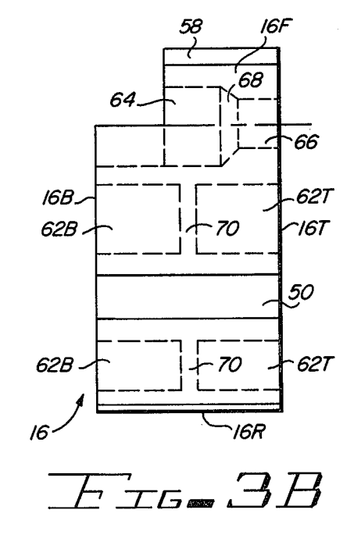

As shown in FIGS. 3A and 3B, the preferred embodiment of the leader block 16 is essentially a rectangular box shape having basically flat sides 16S, flat top 16T and a flat bottom 16B. The front surface 16F is rounded and includes the boss 58 and the slot 54. The rear section 16R is slightly rounded to form a portion of an arc of a radius to match the periphery of the hub 29 as the leader block 16 fits into the slot 38 in the hub 29 (see FIG. 1). The slot 54 leads to an enlarged receiving cavity 64 at a rear 66 of the slot 54. A tapered section 68 gradually decreases the diameter of the cavity 64 to the rounded section 66 at the rear of the slot 54. The slot 54 as well as the cavity 64 and the tapered section or shoulder 68 interface with the threading pin 46 for threading the tape 14 through the drive system as will be discussed later in FIGS. 4A and 4B.

Still referring to FIGS. 3A and 3B, four cavities 62 are formed in the leader block 16 close to the rear surface 16R and at the side 16S which includes the cutout 50. The cavities 62T in the top surface 16T are separated from the cavities 62B in the bottom surface 16B by walls 70. As will be further discussed, the cavities 62B and 62T together with the cutout 50 form a compliant section that permits the leader block 16 to compress at its rear surface 16R at the side 16S containing the cavities 62B, 62T and the cutout 50 to accommodate especially the first layer of tape when the tape is wound onto the take-up reel 28.

Figure 4A:
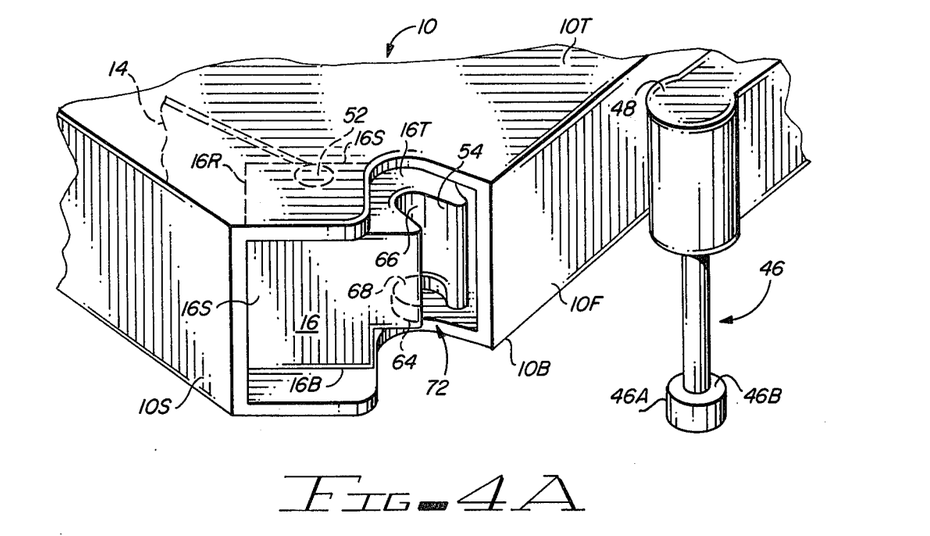
FIGS. 4A and 4B are perspective views illustrating the relative movements involved in interconnecting a coupling device to the leader block and tape cartridge according to the tape drive shown in FIG. 1.

In FIG. 4A, the leader block 16 is shown connected to the magnetic tape 14 by the pin 52 which could be made of a soft plastic material, for instance. Referring to FIGS. 1 and 4A, the cartridge 10 is shown positioned while being inserted into the carriage 24 such that the leader block 16 is interconnected with a coupling device shown as the threading pin 46. The threading pin 46 is shown connected to the follower linkage 48 which can be a part of some threading mechanism such as that shown in FIG. 1. The slot 54 is offset from the leading surface 16F and angled to the side surfaces 16S of the leader block 16. The length of the slot 54 extends from the top surface 16T to the bottom surface 16B. When the leader block 16 is held within a leader block receiving well 72 as shown in FIG. 4A, the length of the slot 24 is parallel to the axis of rotation of the reel 12. The depth of the slot 54 is angled to the side surface 16S such that with the leader block 16 in the leader block receiving well 72, the slot depth is perpendicular to the leading edge 10F of the cartridge 10. The depth of the slot 54 extends a distance into the leader block 16 less than the width of the leader block, i.e., the slot 54 stops short of the side 16S. The slot 54 leads to the enlarged receiving cavity 64 at the rear 66 of the slot 54. A tapered section 68 gradually decreases the diameter of the cavity 64 to the rounded section 66 at the rear of the slot 54. The pin 46 of the follower linkage passes through the slot 24 to the rounded section 66. The pin 46 includes a larger cylinder section 46A with a tapered shoulder 46B for mating with the cavity 64 and the tapered section 68 of the leader block 16.

The cartridge 10 and the leader block 16 are placed within the carriage 24 wherein the cartridge 10 and the leader block 16 have been moved forward in the direction such that the pin 46 is captured within the slot 54. Then as is shown in the FIG. 4B, relative motion is provided between the leader block 16 and the pin 46 and the follower linkage 48. Generally the cartridge 10 is moved downward in the direction of arrow 74. The motion places the tapered shoulder 46B and larger diameter section 46A of the pin 46 into the tapered section 68 at the rear surface 66 of the slot 54 of the leader block 16. By this relative motion, the leader block is positively captured by the coupling device, pin 46, for pulling through a complex tape threading path by the threading means such as shown in FIG. 1.

Figure 4B:
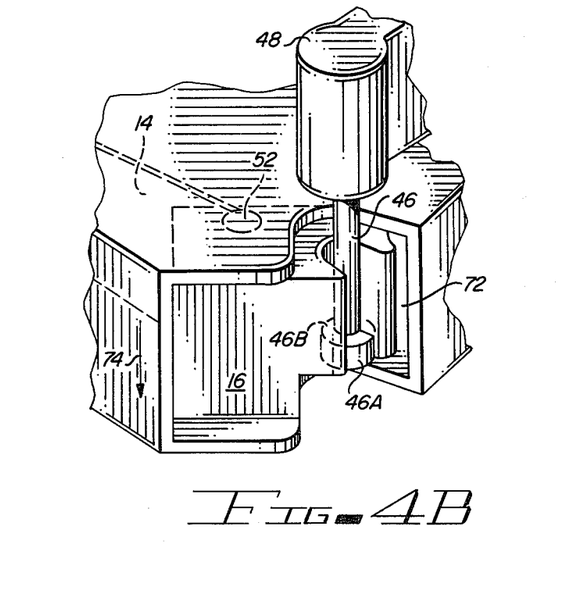
Figure 5:
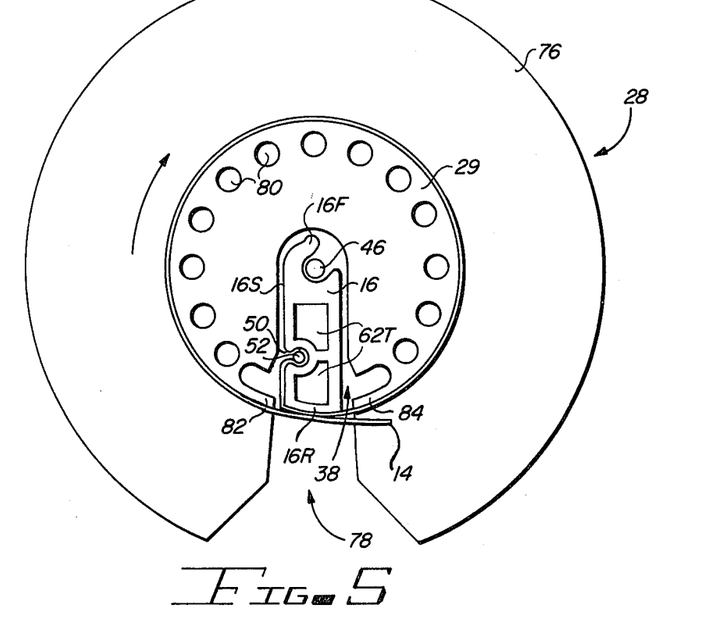
FIG. 5 is a plan view of a take-up reel as shown in FIG. 1 including a leader block of the present invention.

FIG. 5 shows the details of the take-up reel 28, as shown in FIG. 1, including a leader block 16 placed into the slot 38 in the hub 29. One winding of the magnetic tape 14 is shown wrapped around the hub 29. The threading pin 46 remains in contact with the leader block 16 as shown in FIG. 4B. The take-up reel 28 includes a single reel flange 76. The flange 76 is provided with a cutout 78 that matches with the slot 38 in the hub 29. The slot 38 is generally U-shaped to accommodate the rectangular box-shaped leader block 16 and the rounded front section 16F of the leader block 16. The hub 29 may include compliant holes 80 drilled through the hub as well as cantilever sections 82 and 84 formed on the periphery of a hub 29 adjacent to the slot 38. The need for the cantilever sections 82 and 84 is described more fully in patent application, Ser. No. 161,808, filed on June 23, 1980.

Figure 6:
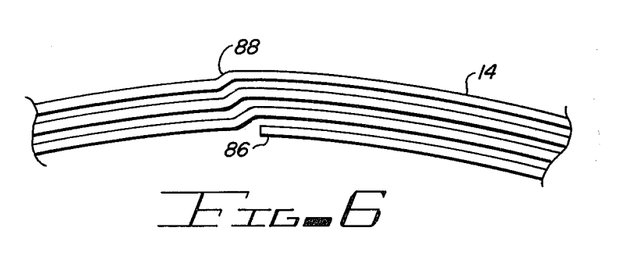
FIG. 6 is a side view of layers of the tape illustrating the potential effect on segments of the tape disposed over a discontinuity.
Figure 7:
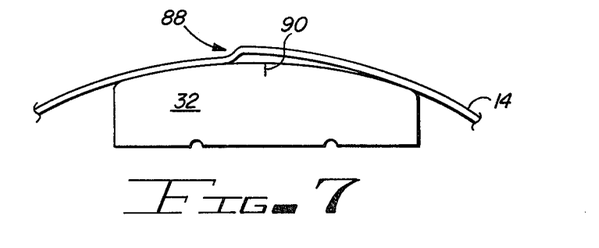
FIG. 7 is a schematic illustration of "tenting" of a segment of magnetic tape over a head.

The cantilever sections assist in the elimination of the creasing of the tape 14 as shown in FIG. 6. In FIG. 6, as the layers of tape 14 are formed over a sharp break such as an end 86 in the tape 14, the subsequent layers of tape crease to form a "tenting" illustrated at reference numeral 88. The "tenting" of the tape 14 will occur at any discontinuity formed in the periphery of the hub 29. FIG. 7 illustrates the "tenting" effect which can cause a narrow section of the tape 14 to be spaced further from the flux gap 90 of the magnetic head 32 than is desirable. In order to reduce the adverse "tenting" effects that these discontinuities may have on layers of the tape which overlay the discontinuities, the cantilever sections 82 and 84 were added to the hub 29 as disclosed in the aforementioned patent application, Ser. No. 161,808. The "tenting" effect will cause a loss of data since the magnetic transitions on the tape 14 in the "tenting" area are not close enough to the magnetic gap 90 to either read or write information. The spacing of the discontinuity between the outer periphery of the hub 29 and the leader block 16 was reduced considerably by the formation of the hub 29 as shown in FIG. 5. However, the use of the cantilever sections 82 and 84 did not accommodate the first layer of tape 14 as it wrapped across the rear surface 16R of the leader block 16. Still referring to FIG. 5, the cavities 62B and 62T together with the cutout 50 formed a relatively compressible section to the side 16S as the first wrap of the tape 14 is wrapped under tension from the cutout 50 along the side surface 16S across the rounded surface 16R and in contact with the cantilever section 84 and then the remaining periphery of the hub 29. The hub as well as the leader block 16, is made of a material which is relatively compressible, such as polycarbonate. Therefore, as the first layer of tape is draped across the rear section 16R and the subsequent layers of the tape 14 are wrapped under tension around the periphery of the hub 29, the side 16S in the leader block 16 containing the cutout section 50 will compress more than the other side. This compression will accommodate the thickness of the first layer of tape such that the first complete layer and subsequent layers of the tape ride on a smooth continuous surface. The compressibility of the leader block 16 as a result of the cavities 62 and the cutout 50 accommodates the first layer of tape as it wraps around the corner of the leader block and the cantilever sections 82 and 84 together with the compressible sections in the leader block 16 all coact to provide a generally smooth tape receiving surface.

Figure 8:
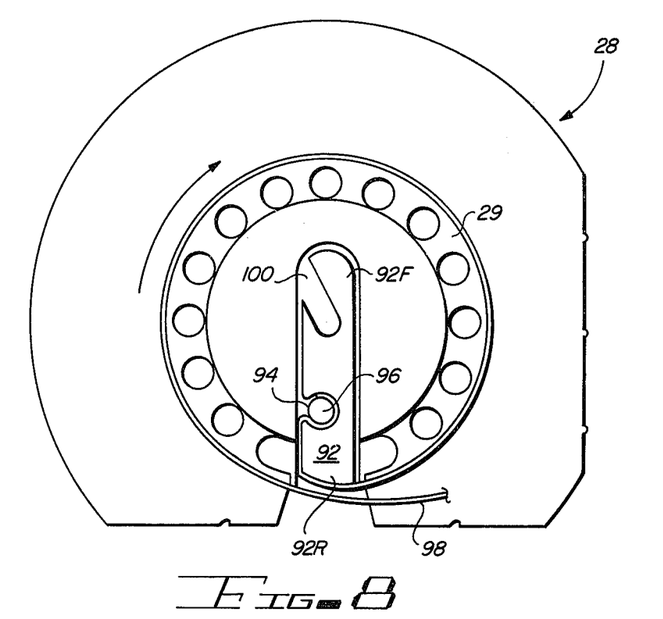
FIG. 8 is a plan view of another leader block embodiment for a tape cartridge as placed in a take-up reel as shown in FIG. 4.

Another embodiment of a leader block is shown in FIG. 8. A leader block 92 is shown inserted into the U-shaped slot in the take-up reel 28. The leader block 92 includes a cutout section 94 in which a pin 96 is inserted for holding the magnetic tape 98. A slot 100 is included in a front surface 92F to interface with an automatic threading system as stated previously. A rear surface 92R is rounded with a radius offset from the radius of the outer periphery of the hub 29. The radius of the rear section 92R is exaggerated in FIG. 8 to identify the change. In the leader block 92, the accommodation for the first wrap of tape 98 is by virtue of the compressibility of the cutout 94 together with the offset radius of the rear section 92R.

Figure 9:
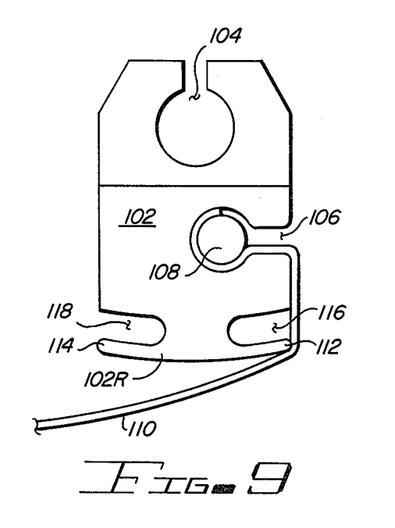
FIGS. 9 and 10 show two further embodiments of leader blocks for tape cartridges according to the present invention.

Another embodiment of a leader block according to the present invention is shown in FIG. 9. A leader block 102 includes a slot 104 for engaging the automatic threading mechanism and a cutout 106 containing a pin 108 for holding a tape 110 to the leader block. Two cantilevered sections 112 and 114 are formed by cutouts 116 and 118 respectively at the rear 102R of the leader block. The cantilever section 112 operates to accommodate for the first wrap thickness while both the cantilevered sections 112 and 114 compress to provide a smooth surface for subsequent layers of the magnetic tape together with the hub of the take-up reel. The hub of the take-up reel may or may not include its own cantilevered sections if the leader block is made according to the embodiment of FIG. 9. To accommodate for only the thickness of the first wrap of tape 112, only the cantilever section 112 is necessary in the leader block 102.

Figure 10:
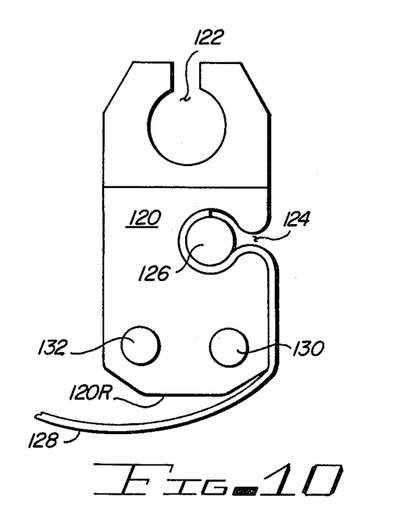

Yet another embodiment of a leader block according to the present invention is shown in FIG. 10. A leader block 120 includes a slot 122 for connection to an automatic threading system as stated previously. The leader block 120 also includes a cutout 124 which likewise accommodates a pin 126 for holding a magnetic tape 128 firmly connected to the leader block 120. In this embodiment, the leader block 120 includes cavities 130 and 132 formed at the rear surface 120R of the leader block 120. The cavities 130 and 132 may be holes drilled completely through the leader block 120 or they may be partial holes formed through either one or both sides of the leader block such as that shown in the cavities 62 of the leader block 16 such as shown in FIGS. 3A and 3B. As before for the embodiment in FIG. 9, the cavity 130 together with the cutout 124 provides the compressibility for the first wrap of tape according to the present invention while the cavity 132 together with the hub of the take-up reel can be used to compress to accommodate any potential discontinuity between the leader block and the periphery of the hub. For the purposes of the present invention, only cavity 130 together with the cutout 124 are necessary for the compressibility of the leader block 120 for the accommodation of the first wrap of the tape 128.

The principles of the present invention have now been made clear in an illustrative embodiment. There will be immediately obvious to those skilled in the art many modifications of the structure, arrangement, proportions, the elements, materials and components used in the practice of the invention. For instance, many different cartridge shapes as well as the interconnection of the leader block to the take-up reel can be substituted without departing from the present invention. It should be evident that the type of threading device as well as the tape path taken by the magnetic tape is for purposes of the disclosure of the preferred embodiment. The interface of the leader block with the automatic threading apparatus may be by other means other than the slot shown in the preferred embodiments. Likewise, the number of cavities shown in the leader block can be changed without departing from the compressibility factor which determines the advantages of the present invention. The cavities may be through holes or may be only one in number depending upon the amount of compressibility desired. Likewise, the shape of the take-up reel and its U-shaped slot is for accommodating the particular shape of the leader block according to the preferred embodiments and should not be taken to restrict the present invention. The tape drive apparatus is illustrative of the adaptation of the preferred embodiment and other apparatus could be determined by those skilled in the art again without departing from the present invention. The appended claims are, therefore, intended to cover and embrace any such modifications within the limits only of the true spirit and scope of the invention.

What is claimed is:

1. A magnetic tape cartridge comprising:
    an approximately square box having two elongated side pieces, elongated leading edge and rear edge pieces, all interconnecting nearly flat top and bottom sections, with a tape access opening to the interior of the cartridge at one corner of the leading edge and one side piece, and a drive means opening in the bottom section of the box, the tape access opening including a leader block receiving well;
    a reel positioned at the approximate center of the box to be accessed for rotation at said drive means opening;
    a web of magnetic tape wound on said reel and having a free end;
    a leader block having a cutout section in one side of said leader block approximate to its rear surface for attaching the free end of said web, said leader block of a size for capture in the tape access opening in the box in the leader block receiving well;
    connection means formed in said leader block for permitting threading of said leader block through a tape drive and thereby unreeling said magnetic tape for utilization in the tape drive; and
    at least one compliant section in said leader block formed adjacent to the rear surface and the side surface of said leader block containing said cutout section, the compliant section of the leader block enabling the rear surface to provide a smooth circumferential surface for subsequent layers of magnetic tape.

2. A magnetic tape cartridge as defined in claim 1 wherein said compliant section in said leader block includes at least one cavity formed parallel to said cutout section.

3. A magnetic tape cartridge as defined in claim 1 wherein said compliant section in said leader block includes four cavities, two formed in the bottom surface of said leader block and two formed in the top surface directly opposite the two cavities formed in the bottom surface with a wall separating each of the two opposing cavities, one set of top and bottom surface cavities formed adjacent to each side of said cutout and to the side surface of the leader block containing the cutout section.

4. A magnetic tape cartridge as defined in claim 1 wherein said compliant section in said leader block includes a cantilevered section formed at least at the rear and side surface of the leader block containing said cutout section.

5. A magnetic tape cartridge as defined in claim 1 wherein said connection means includes:
    said leader block having a slot with a given length and a given depth with the given length extending across the full height of and approximate to the leading surface of said leader block, the given length being parallel to the axis of rotation of said reel and the slot having a given depth extending perpendicular to the leading edge of the box when said leader block is held within the leader block receiving well, the given depth being less in size than the given width of said leader block:
    said leader block having a receiving cavity at the rear of said slot extending from the bottom a distance less than the height of the leading surface of said leader block said receiving cavity having a width larger than the given width of said slot; and
    a shoulder in said leader block extending from said receiving cavity to said slot.

6. A magnetic tape cartridge as defined in claim 5 wherein said leader block is adapted to be engaged by a coupling device of an automatic threading system, said coupling device comprising a pin having a diameter for entering said slot and a cylindrical section of a diameter larger than the diameter of said pin and the given width of said slot for entering said receiving cavity.

7. A magnetic tape cartridge as defined in claim 1 wherein said leader block includes a boss at its leading surface for interfacing with the leading edge piece of said box to hold said leader block within the leader block receiving well.

8. A magnetic tape cartridge as defined in claim 1 wherein said leader block is of a size to effectively seal the tape access opening in the box and for capture in the leader block receiving well.

9. A magnetic tape cartridge as defined in claim 1 wherein said leader block is essentially a rectangular shaped block having a convex rounded rear surface, said leader block being of a size to fit a U-shaped cutout in a hub of a take-up reel, with the rounded rear surface having an arc of a radius that completes the circumference of the hub and together with said compliant section provides an essentially smooth circumferential surface for the hub for the subsequent outer layers of magnetic tape.

10. A magnetic tape cartridge comprising:
    an approximately square box having two elongated side pieces, elongated leading edge and rear edge pieces, all of said pieces interconnecting nearly flat top and bottom sections in a manner to leave tape access opening to the interior of the cartridge at one corner of the leading edge piece and one side piece and the bottom section of the box having a drive means opening, well means in said square box at said one corner opening outwardly to said tape access opening and having a shape for receiving a leader block;
    a reel positioned at the approximate center of the box to be accessed for rotation coaxially to said drive means opening;

a web of magnetic tape wound on said reel and having a free end;

a leader block having a cutout section in one side of said leader block approximate to its rear surface for attaching the free end of said web, said leader block having a size and shape for releasable capture in the well means;

said leader block having a slot with a length and a depth with the slot extending along its length across the full height of and approximate to the leading surface of said leader block, the slot length being parallel to the axis of rotation of said reel and the slot depth extending perpendicularly to the leading edge of the box when said leader block is captured within said well means, the slot depth being less in size than the width of said leader block;

said leader block having a receiving cavity at the rear of said slot and extending from the bottom a distance aligned with the slot length less than the height of the leading surface of said leader block, said receiving cavity having a width larger than the width of said slot;

a shoulder in said leader block extending from said receiving cavity to said slot; and at least one compliant section in said leader block disposed adjacent to the rear surface and the side surface of said leader block containing said cutout section, said one compliant section incuding four cavities, two cavities opening to the bottom surface of said leader block and two cavities opening to the top surface directly opposite the two cavities opening to the bottom surface and a wall separating each of the two opposing cavities, one set of top and bottom surface opening cavities disposed adjacent to each side of said cutout and to the side surface of the leader block containing the cutout.

11. A magnetic tape cartridge as defined in claim 10 wherein said leader block is essentially a rectangular shaped block having a rounded rear surface, said leader block being of a size to fit a U-shaped cutout in a hub of a take-up reel, with the rounded rear surface having an arc of a radius that completes the circumference of the hub and together with said compliant section provides an essentially smooth circumferential surface for the hub for the subsequent layers of magnetic tape.

12. In a magnetic tape drive system having a threading means for automatic threading of a magnetic tape from a cartridge past air guides and a transducer to a drive mounted take-up reel, the combination wherein said cartridge includes:

an approximately square box having two elongated side pieces, elongated leading edge and rear edge pieces, all interconnecting nearly flat top and bottom sections, and having a tape access opening to the interior of the cartridge at one corner of the leading edge and one side piece and a drive means opening in the bottom section of the box, a leader block receiving well opening outwardly to said tape access opening and having an interior opening to said box interior for passing tape therethrough;

a reel positioned at the approximate center of the box to be accessed for rotation at said drive means opening;

a web of the magnetic tape wound onto said reel and having a free end;

a rectangular box-shaped leader block having a convex arc-shaped rear surface, said leader block having a cutout section in one side of said leader block approximate to its rear surface for attaching the free end of said web exterior to said square box, said leader block having a size for capture in the leader block receiving well, connection means in said leader block for connection to the threading means for unreeling said magnetic tape from said reel through said leader block receiving well and said interior opening; and at least one compliant section in said leader block disposed adjacent to the rear surface and adjacent to the side surface of said leader block containing said cutout section, said compliant section for assisting said leader block to conform to a cutout in a hub of the take-up reel such that the arc-shaped rear surface of said leader block faces outwardly of said hub to provide an essentially smooth circumferential surface for the hub for the radially outward layers of magnetic tape.

13. In a magnetic tape drive system as defined in claim 12 wherein said compliant section in said leader block of said cartridge includes at least one of said cavities extending parallel to and being spaced from said cutout section.

14. In a magnetic tape drive system as defined in claim 12 wherein said compliant section in said leader block of said cartridge includes four cavities, two of said cavities disposed adjacently the bottom surface of said leader block and another two of said cavities disposed adjacently the top surface and directly opposite to the two cavities adjacent the bottom surface with a wall separating each of the two opposing cavities, one set of top and bottom surface adjacent cavities disposed adjacent to each side of said cutout and to the side surfaces of the leader block containing the cutout section.

15. In a magnetic tape drive system as defined in claim 12 wherein said compliant section in said leader block of said cartridge includes a cantilevered section disposed at the rear surface and the side surface containing said cutout section.

16. In combination, a magnetic tape cartridge in which a length of magnetic tape is wound on a single reel with the free end of the tape permanently connected to a leader block exterior to said magnetic tape cartridge, said cartridge completely surrounding said reel of magnetic tape except for an opening provided at one corner of said cartridge through which tape wound on said reel to be unwound as said leader block is moved away from said cartridge and through which the tape extends to the exterior leader block, a one corner portion of said cartridge through which said tape passes having a leader block receiving well including a bottom wall which has an opening through which said tape extends to outside said cartridge and said well including opposed walls attached to said bottom wall for engaging the leading and trailing walls of said leader block, said leader block overlaying said opening when said cartridge is not in use, said leader block including a slot extending from top to bottom of said leader block approximate to its leading wall and having a given width, said slot extending to and having an opening also extending from top to bottom of said leader block with said opening having two widths, at least one width being larger than the given width of said slot, said leader block further including a cutout section in one side wall for attaching the tape to the leader block, and including at least one compliant section in said leader block disposed adjacently to a rear wall of said leader block and the side wall of containing said cutout section.

17. A magnetic tape cartridge as defined in claim 16 wherein said compliant section in said leader block includes at least one cavity extending parallel to said cutout section.

18. A magnetic tape cartridge as defined in claim 16 wherein said compliant section in said leader block includes four cavities, two of said cavities disposed adjacent the bottom wall of said leader block and two of said cavities disposed adjacent the top wall and directly opposite to the said two cavities disposed adjacent the bottom wall and a wall separating the two directly opposite cavities, one set of top and bottom wall ones of said cavities disposed adjacent to each side of said cutout and to the side wall of the leader block containing the cutout section.

19. A magnetic tape cartridge as defined in claim 16 wherein said compliant section in said leader block includes a cantilvered section disposed adjacently to the rear surface and the side wall containing said cutout section.

20. A magnetic tape cartridge as defined in claim 16 wherein said leader block is essentially a rectangular shaped block having a convexly rounded rear surface, said leader block being of a size to fit a U-shaped cutout in a hub of a take-up reel with the rounded rear surface having an arc of a radius that completes the circumference of the hub and together with said compliant section enabling radially compressibility of said leader block to provide an essentially smooth circumferential surface for the hub for any layers of magnetic tape wound on the hub.

* * * * *